United States Patent [19]

Stroud et al.

[11] 4,161,683

[45] Jul. 17, 1979

[54] ALTERNATOR FOR A REGENERATIVE FEED-BACK SYSTEM

[76] Inventors: Lebern W. Stroud, 4620 Biscayne, Fort Worth, Tex. 76117; Jerry W. Lemons, 7533 Terry Dr., Fort Worth, Tex. 76118

[21] Appl. No.: 834,475

[22] Filed: Sep. 19, 1977

Related U.S. Application Data

[63] Continuation of Ser. No. 614,904, Sep. 19, 1975, abandoned.

[51] Int. Cl.² ............................................. H02P 11/00
[52] U.S. Cl. ..................................... 322/87; 310/198; 310/208
[58] Field of Search ...................... 307/10 R; 219/133; 322/87, 47, 28; 310/198–208, 257

[56] References Cited

U.S. PATENT DOCUMENTS

| | | | |
|---|---|---|---|
| 2,233,982 | 3/1941 | Kelley | 310/208 |
| 3,201,627 | 8/1965 | Harrington | 310/198 |
| 3,290,759 | 12/1966 | Cory | 310/202 X |
| 3,432,707 | 3/1969 | Peters et al. | 310/208 X |
| 3,739,213 | 6/1973 | Willyoung | 310/206 X |
| 3,770,976 | 11/1973 | Stroud et al. | 307/10 R |

*Primary Examiner*—Robert J. Hickey
*Attorney, Agent, or Firm*—Wofford, Fails & Zobal

[57] ABSTRACT

The specification discloses an improved motor vehicle alternator adapted to be coupled to a regenerative feed-back system. The stator of the alternator has fourteen coils per phase, each coil having three turns. The wire is 13 A.W.G. electrically conductive. The feed-back system has the output of the multi-phase alternator coupled to its rotary field to self-excite the alternator when current is drawn from the output by a welding unit or other type of load. A DC power supply is employed normally to excite the rotary field during no load conditions.

15 Claims, 4 Drawing Figures

025
ALTERNATOR FOR A REGENERATIVE FEED-BACK SYSTEM

This application is a continuation of U.S. Pat. application Ser. No. 614,904 filed Sept. 19, 1975, now abandoned.

BACKGROUND OF THE INVENTION

1. Field of the Invention

This invention relates in general to a system for increasing the power and current from the electrical system of a motor vehicle for operating a load such as a welding system, and in particular to an improved alternator for this system.

2. Description of the Prior Art

In U.S. Pat. No. 3,770,976 issued to Stroud et al on Nov. 6, 1973, a regenerative feedback system for a motor vehicle is described. The system is operated off of the electrical system of a conventional motor vehicle and is capable of producing a large current output for welding operations. The system described therein utilizes a conventional motor vehicle alternator. While that system is successful, applicant's wish to improve the conventional alternator so as to increase the maximum current output at a given RPM. Increased current allows welding to be conducted at a lower engine RPM and with a larger rod size. It is also desirable to reduce the reactance of the conventional motor vehicle alternator which reduces the tendency for arcing between the switches in the system described therein when the system goes from load to no-load.

Conventional automobile alternators utilize four turns per coil in the stator and use 14.5 A.W.G. wire. The four turns per coil produces a relatively high open circuit voltage at a low RPM, which is desirable for charging of the battery while idling. Increasing the speed of the engine increases the voltage and current output, however reactance also increases with speed. The increased reactance at high speeds causes the current under load to level off. Reducing the number of turns per coil lowers the reactance, however the reduction also lowers the open circuit output voltage.

SUMMARY OF THE INVENTION

It is an object of the present invention to provide an improved alternator for use with a regenerative feed-back system. The alternator has a stationary stator with a revolving rotor located concentrically therein. The stator is an annular structure of ferro-magnetic material with segments separated by slots spaced around the structure. The stator winding is of 13 A.W.G. wire and each coil is comprised of three turns. Consequently although the open circuit output voltage is reduced as compared to a conventional alternator, the resistance and reactance is also reduced by the larger wire size and fewer turns, thereby increasing the maximum current. The resulting relationship between output voltage and output current provides the maximum power available for welding in a feed-back application.

DESCRIPTION OF THE PREFERRED EMBODIMENT

Figure 1:
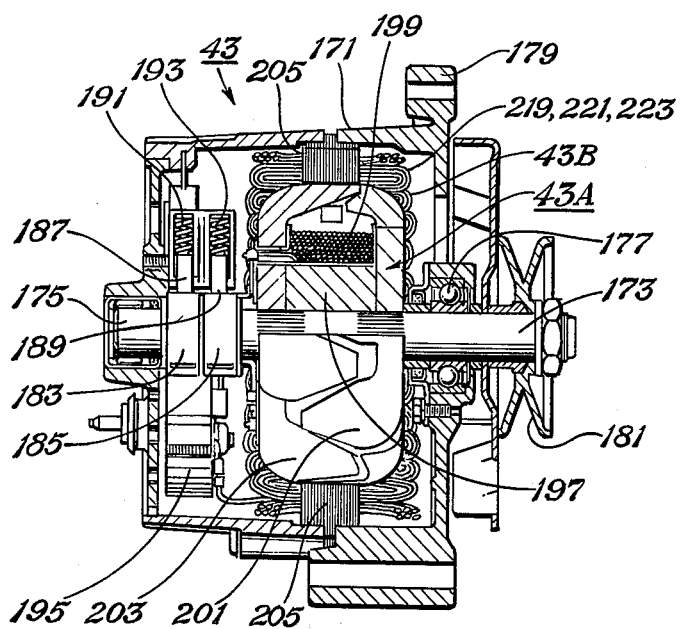
FIG. 1 is a vertical cross-sectional view of an alternator.

Referring to FIG. 1, a diode-rectified AC generator or alternator is identified at 43, and includes a rotary field coil or rotor 43A and stator 43B. Stator 43B is carried rigidly by a case 171. Rotor 43A is rotatably carried with respect to case 171 by a shaft 173 which is journaled by roller bearings 175 and ball bearings 177 to case 171. Brackets 179 formed in the case 171 are adapted to receive bolts for coupling the alternator 43 to mounting braces adjacent the motor vehicle engine (not shown). A pulley 181 mounted to shaft 173 is adapted to receive a belt from the motor vehicle engine for rotating the rotor 43A. Case 171 is approximately 5¾ inches in diameter and shaft 173 approximately 5½ inches in length.

Shaft 173 has two conductors or slip-rings 183, 185 mounted rigidly to it and insulated from each other and from the shaft. Slip-rings 183, 185 are connected by conductors (not shown) to the rotor 43A. Carbon brushes 187, 189 are mounted to case 171 and are biased by springs 191, 193 into sliding contact with the slip-rings 183, 185. Slip-rings 183, 185 and brushes 187, 189 provide a connection, shown schematically as 95 in FIG. 4, for applying a DC exciting source to the rotor 43A. A diode-rectifier system 195 (see FIG. 3) is attached to the inner side of the case 171 and connected by conductors to the stator 43B for converting the AC output to a pulsating output with a DC component.

Rotor 43A has a ferro-magnetic core 197, which is wrapped with several layers of conductive wire 199 to form an electromagnet when excited. The opposite sides of the core 197 have flanges which form north and south poles 201, 203. The poles are formed into seven north poles and seven south poles which bend over and mesh, but do not touch, with a corresponding pole of the opposite polarity.

Figure 2:
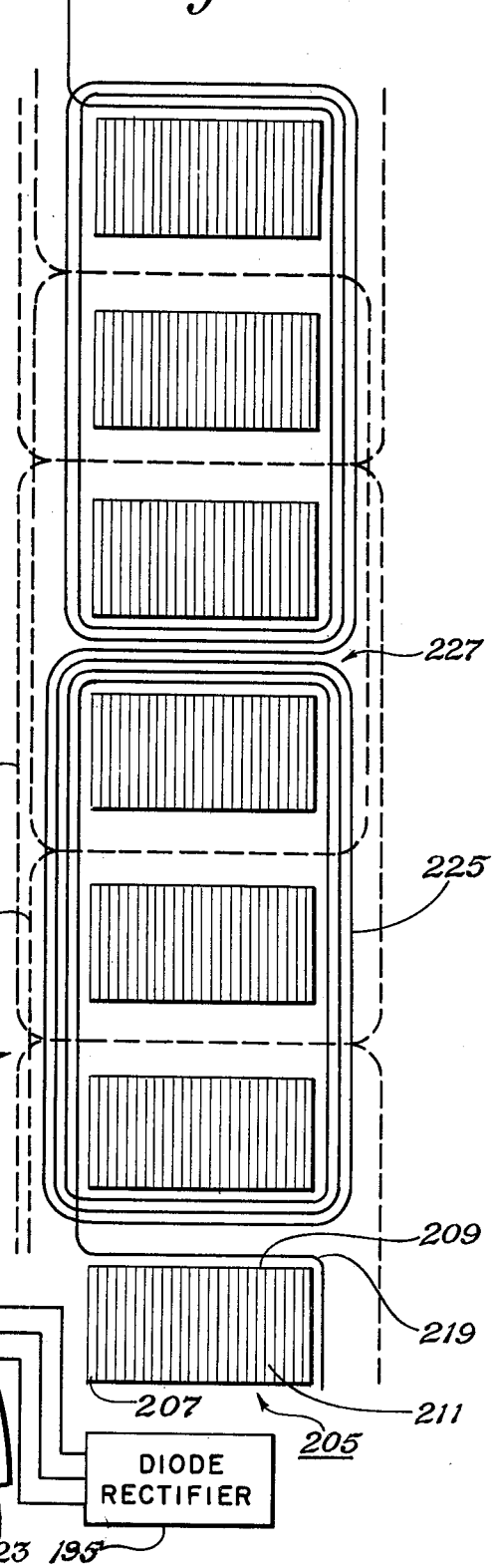
FIG. 2 is a schematic enlarged view from the inside of a stator of the alternator of FIG. 1 in accordance with the present invention, with the stator shown laid out.

Stator 43B has an annular core 205 which is composed of a plurality of stacked ferro-magnetic plates 207, FIG. 2. There are 42 slots 209, FIGS. 2 and 3, formed in the stator core 205. Slots 209 extend parallel to the axis of the stator core 205 the full width of the core. The depth of the slots 209 is slightly more than half of the radial thickness of the core. In the preferred embodiment, stator core 205 is approximately 5⅛ inches in outside diameter, ⅞ inch wide longitudinally and ½ inch thick radially. The slots 209 are approximately ⅜ inch deep, being 1/16 inch wide at the entrance and 3/16 inch wide on the inner area. The 42 portions between each slot 209 are designated segments 211. Rotor 43A is carried within the stator core 205, with the poles 201, 203 being approximately 0.03 inch from segments 211.

Figure 3:
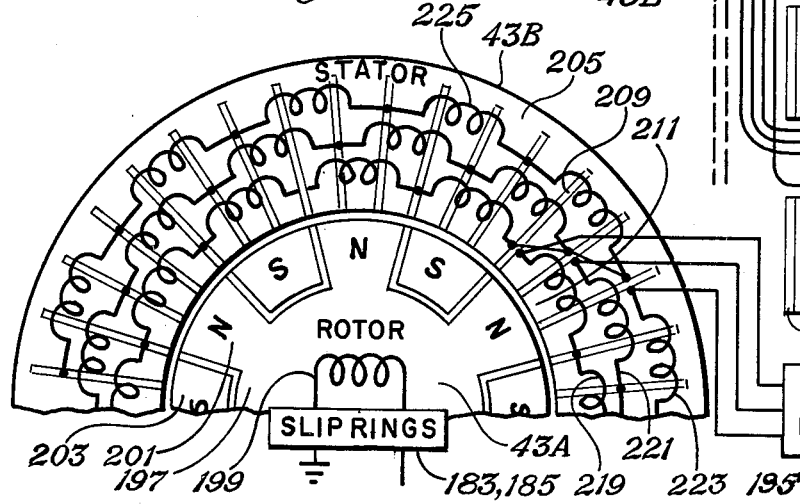
FIG. 3 is a schematic enlarged view of the alternator of FIG. 1 in accordance with the present invention.

Stator windings 219, 221 and 223 of electrically conductive wire are wound to the stator core 205. As shown schematically in FIG. 2, the windings are wound in slots 209, which have insulated inserts (not shown) placed therein to prevent electrical contact with the wires. The windings in FIG. 3 are shown schematically with individual turns shown as loops, however are actually layered on top of each other, with each loop encircling three segments, as in FIG. 2. Furthermore, the windings are coated with electrical insulation. FIG. 3 is a partial schematic view of the rotor 43A and a stator 43B with the stator core 205 exaggerated in radial thickness in order to show the windings more clearly. As FIG. 3 shows, there are three separate windings 219, 221, 223, one for each phase of the three-phase alternator. Each phase winding is wound completely around the inner side of the stator core 205, with the end of each winding being connected to the other phase windings, forming a "Y" connection, as shown also in FIG. 4. The other ends of the phase windings do not contact the "Y" junction and are connected to the diode-rectifier system 195, shown in FIG. 4 as diode-rectifiers 71, 73, 75, 77, 79 and 81.

Referring to FIG. 2, a portion of one of the phase windings, indicated as 219, is schematically shown. Each phase winding is comprised of a series of coils 225, each coil wrapped around three segments 211. Since there are 42 segments in the preferred embodiment, there will be fourteen coils in each phase. Each coil has three turns or layers wrapped around the three segments 211. Consequently, as indicated at numeral 227, there will be six wires in each slot 209. All conventional alternators for motor vehicles known to the inventor utilize four turns in each coil with eight wires in each slot. Fewer turns reduces the reactance of the stator. The coils 225 of the windings should be wound as tightly as possible without flattening the exposed curved ends. FIG. 2 shows the exposed ends as flat but in fact they are curved.

As shown by the dashed lines 221, 223 in FIG. 2, the other phase windings are identically wound, each being one slot offset from the other to place the generated signals out of phase with each other. The wire used in the stator winding is 13 A.W.G. (American Wire Gauge), which is 0.07196 inch in diameter. Conventional alternators for motor vehicles utilize 14.5 A.W.G. which is approximately 0.06036 inch in diameter. Thicker wire size allows a higher maximum current. The conversion from A.W.G. to inches is derived from Buchsbaum's Complete Handbook of Practical Electronic Reference Data, by William H. Buchsbaum (Prentice-Hall, Inc. 1973). The alternator in the preferred embodiment, except for the stator windings is manufactured by Delco-Remy, a division of General Motors, in Anderson, Indiana. The alternator is known as a 10-S1 series/type 100. This type of alternator is described on pages 2–85 of "Motor's Auto Repair Manual, 37th Edition", published by Motor's, 250 West 55th Street, New York, N.Y. Alternators manufactured by others of the same general characteristics may be suitable as well.

In operation, a DC current source is supplied to the slip-rings 183, 185, shown schematically in FIG. 3. This magnetizes the poles 201, 203. As the rotor 43A is rotated by the motor vehicle engine, magnetic flux from each pole 201, 203 cuts the coils 225 of the stator windings, inducing an AC current into the stator 43B. This alternating current is rectified by the rectifier system 195 to produce a pulsating voltage having a DC component. The frequency of the pulsating component will be dependent upon the RPM of the engine while the magnitude of the DC component will be dependent upon the RPM of the engine as well as the electrical input to the rotary field or rotor 43A.

Figure 4:
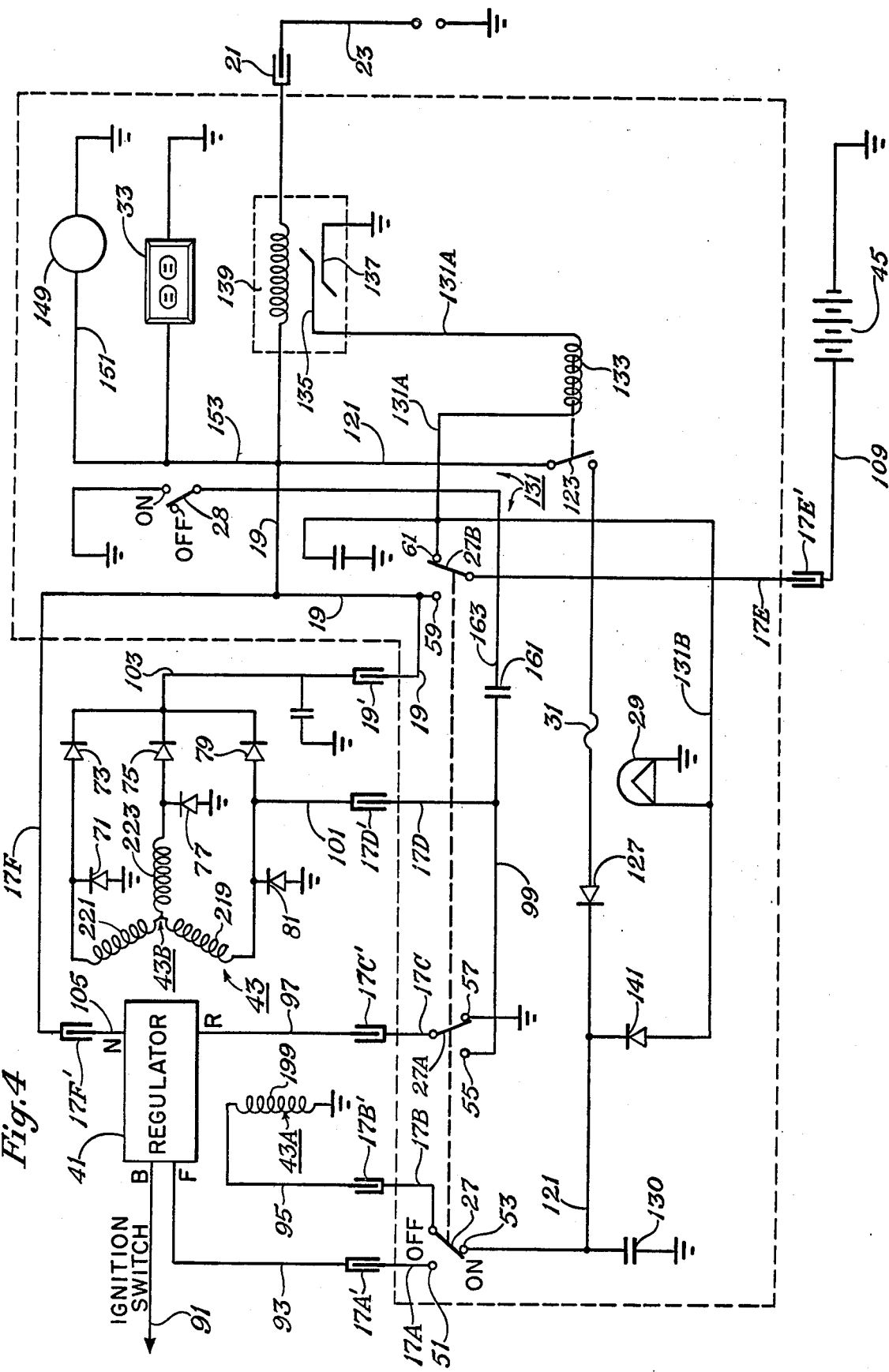
FIG. 4 illustrates the electrical circuitry of the regenerative feed-back system within which the alternator of FIG. 1 is a portion thereof.

This alternator is adapted to be utilized with a regenerative feed-back system for increasing the power and current output for operating a work load such as a welding unit. As described in U.S. Pat. No. 3,770,976, the system may be permanently secured to a motor vehicle under its hood. Referring to FIG. 4, the system 11 is illustrated in the dotted lines. It has a plurality of leads 17 adapted to be coupled to the electrical system of the motor vehicle as well as a lead 19 also to be coupled to the electrical system. An anode plug 21 is provided for connection with a cable 23 which is coupled to the electrode holder of a welding unit (not shown). A ground cable 25 is attached by way of clamps to the frame of the vehicle and to the metal to be welded.

The electrical leads 17 comprise leads 17A–17F and are employed for connecting system 11 to the vehicle regulator 41, alternator-rectifier system 43, and battery 45. Lead 19 connects the output of the alternator-rectifier system 43 with the system 11 and to the anode plug 21. Each of the leads 17A–17F and lead 19 have connectors 17A′–17F′ and connector 19′ respectively for allowing the leads to be connected to the regulator 41, the alternator-rectifier system 43, and the battery 45 after the system 11 has been installed.

The master switch is illustrated at 27 and controls ganged switches 27A and 27B when moved to its ON or OFF positions for switching the system 11 into or out of the electrical system of the motor vehicle. Switch 27 is adapted to contact either terminal 51 or 53, switch 27A contacts either terminal 55 or 57, while switch 27B contacts either terminal 59 or 61. In the ON position of the switch 27 the switches 27, 27A and 27B will be in the positions shown (in contact with terminals 53, 57, and 61 respectively) to switch the power system 11 in for work load operations. In the OFF position of the switch 27, the switches 27, 27A and 27B will be switched to opposite positions (in contact with terminals 51, 55, and 59 respectively) to switch the system 11 out and to allow the motor vehicle to be operated under normal driving conditions.

For normal driving operations switch 28 will be moved to the OFF position. It will be switched to the ON position when welding thin gauge metals or for power tool operations as will be described subsequently.

When the switch 27 is moved to the OFF position to switch the system 11 out of the electrical system of the vehicle to allow the vehicle to operate under normal driving conditions, the battery and alternator-rectifier system output will be connected together and to the regulator which will be connected to the rotor 43A of the alternator-rectifier system. Thus the output of the alternator-rectifier system will be applied to maintain a charge on the battery and the rotor 43A of the alternator-rectifier system will be excited by the battery by way of the regulator.

As illustrated, the regulator 41 has a B terminal to be connected to the ignition switch of the motor vehicle by way of conductor 91. In addition F, R, and N terminals are also provided. In the OFF position of the switch 27 the F terminal of the regulator will be connected to the rotor 43A by way of conductor 93, conductor 17A, switch 27, conductor 17B, and conductor 95. Slip rings 183, 185, FIG. 1, are provided to allow the rotor 43A to be connected electrically to conductor 95 and to ground. The R terminal of the regulator will be connected to the stator 43B by way of conductor 97, conductor 17C, switch 27A, conductor 99, conductor 17D, and conductor 101. The N terminal of the regulator will be connected to the output 103 of the alternator-rectifier system and to battery 45. Connection to output 103 will be by way of conductor 105, conductor 17F, and conductor 19 while connection to battery 45 also will be by way of switch 27B, conductor 17E and conductor 109.

In the normal operations of the alternator-rectifier system and regulator, the regulator senses the voltage at the stator by way of terminal R and if it increases beyond a certain level then the regulator reduces the input applied to the rotor by way of terminal F thereby reducing the output of the alternator-rectifier system. In the conventional motor vehicle employing a 12 volt battery, the regulator limits the output of the three-phase rectifier system to not greater than 15.5 volts DC to prevent overcharging of the battery.

When the master switch 27 is moved to the ON position shown in FIG. 4, the regulator 41 will be disconnected from the alternator-rectifier system 43 and the battery 45 will be disconnected from the regulator 41 and from the output of the alternator-rectifier system. In addition, a feedback circuitry will be connected from the output of the alternator-rectifier system to the rotor 43A and which will allow the alternator-rectifier system to be self-excited when the work load, coupled to the output of the alternator-rectifier system, draws current. Self-excitation of the alternator-rectifier system will provide increased power and current for the load upon demand. The output will be a pulsating output having a DC component.

The feed-back circuitry comprises conductor 121 coupled to conductor 19 and to terminal 53. Coupled in the feed-back circuitry 121 is a normally open switch 123, the fuse 31, a diode 127, and a capacitor 130 coupled to ground. Also provided is a circuitry 131 coupled to terminal 61 and including conductor 131A having a solenoid coil 133 coupled to a contact 135 which along with contact 137 form a normally open magnetic reed type switch which is controlled by a solenoid coil 139 coupled in the output 19. The circuitry 131 also includes conductor 131B which is connected to the feed-back circuitry by way of diode 141. Conductor 131B additionally includes the pilot light 29.

For heavy welding operations, the vehicle's engine will be started and master switch 27 then will be switched to the ON position to switch the system 11 into the motor vehicle electrical system. Switch 28 will remain in the OFF position. A manual throttle control (not shown) will be adjusted to obtain the desired RPM of the engine and hence the desired output voltage from the three-phase rectified system depending upon the thickness of the material desired to be welded. A voltmeter 149 coupled to the output 19 by way of conductor 151 and conductor 153 is provided to allow the operator to monitor the output to obtain the desired voltage output under no-load conditions.

When the master switch 27 is moved to the ON position to switch in the system 11, switch 27 will disconnect the F terminal of the regulator 41 from the rotor and connect the feed-back circuitry 121 to the rotor instead. Switch 27B will disconnect the battery 45 from output 19 and connect the battery to circuitry 131. In addition, switch 27A will disconnect the R terminal of the regulator from the stator windings 219, 221 and 223.

Under no-load conditions, contacts 135 and 137 will be open. In addition the feed-back circuitry will be opened by normally open switch 123 and the rotor 43A will be excited by the battery 45. The flow path from battery 45 to rotor 43A will be by way of conductor 109, conductor 17E, switch 27B, conductor 131B, diode 141, feed-back circuitry 121, switch 27, conductor 17B and conductor 95. Pilot light 29 also will be energized when the rotor is excited by battery 45. Under no-load conditions when the rotor is excited by the battery, the voltage at 19 will be a function only of the engine RPM while the current at the output will be zero. The current supplied to the rotor 43A from battery 45 will be constant and will be about 3 or 4 amps.

When welding operations are begun and an arc is struck, the coil 139 will draw current to close contacts 135 and 137. When this occurs, the output from the battery 45 will be applied to energize relay coil 133 to close switch 123 thereby completing the feed-back circuitry from the output of the alternator-rectifier system to the rotor 43A to self-excite the alternator-rectifier system. The output from the three-phase rectified system applied through the feed-back circuitry 121 will be at a greater potential than the output of battery 45 whereby diode 141 will be reversed biased and will block and terminate the battery output to the rotor 43A. Thus the alternator-rectifier system will be completely self-excited to produce an increase in output power and current.

In this respect under load conditions the current output of the alternator-rectifier system depends on the magnetic flux density produced by the rotor 43A and the RPM of the rotor. The voltage output depends on the RPM and will be limited by the load. If the RPM is fixed as will be the case for a given welding operation, the voltage output will drop from no-load when an arc is struck and will be held at a certain level. The current output, however, will vary dependent upon the RPM and flux density produced by the rotor, the flux density of which will be a function of the current applied to the rotor.

In normal welding operations, it has been found that the current differential between a normal arc and a full short is about 10 amps. For example if an electrode is to be operated at 60 amps maximum, 50 amps will be consumed by the load, and 10 amps will be applied back to self-excite the rotary field. This amount of current is more than double that applied to the rotor when excited by the battery 45. The current at output 19 increases with the engine RPM, but the current applied back to the rotor remains at approximately 10 amps. Hence when the rotor is self-excited by the output of the three-phase rectified system a large amount of current will be provided to allow heavy welding operations to be carried out. The protective fuse 31 is provided to protect the rotor in the event that the feed-back current rises above 15 amps.

Due to the AC component and other harmonics present in the output, the welding electrode generally will not stick during normal welding operations. If it does not stick and the electrode becomes grounded there will be no feed-back since all of the current will be flowing to ground. At this point the rotor will become excited by the battery. After the electrode is broken free and an arc again struck feed-back again will be applied to self-excite the rotor.

The purpose of the diode 127 is to prevent the output from the battery 45 being applied to the output 19. Capacitor 130 also is employed to obtain a more constant DC level on the rotor from feed-back to protect the points on the contacts of the relay switch 123. It also reduces the inductive reactance of the rotor 43A.

Provision also is made to increase the voltage output of the three-phase rectifier system to allow small power tools to be operated off of the output as well as to allow welding to be carried out on thin gauge metal which requires a large amount of voltage in order to lengthen the welding arc so that lightweight materials can be welded at low current. In this respect, a capacitor 161 is provided to be electrically coupled between two diodes 79 and 81 of the stator winding and to ground by way of conductor 163 when switch 28 is closed or moved to the ON position. When switch 28 is closed, the capacitor 161 will charge and discharge as the rotor cuts each of the stator windings. It has been found that the capacitor 161 when coupled to ground will approximately increase the voltage output under no-load conditions by 1.73. The current output however will not be increased.

In obtaining the desired output at 19 for lightweight welding operations or for power for small power tools by way of outlets 33, master switch 27 will be turned to the ON position and the throttle of the vehicle adjusted until the voltage at the meter 149 reflects about 50 volts. The switch 28 will be turned to the ON position to increase by 1.73 this output voltage.

In one embodiment the components of the present system have the following specifications.

| | |
|---|---|
| Master Switch 27 | A four pole double throw switch |
| Feedback Relay Switch 123 and 133 | A 12 volt DC coil type relay with a double pole single throw normally open switch |
| Fuse 31 | 15 amp 3 AG 32 volt feed-back fuse and holder |
| Capacitor 130 | 1000 MFD, 50 volt DC electrolylic capacitor |
| DIODE 127 and 141 | 20 amp 200 PIV |
| Meter 149 | 0-150V DC meter |
| Tool Outlet 33 | 115 volt, 15 amps, duplex receptacle with weather-proof cover |
| Reed Switch 135, 137 and Relay Coil 139 | A magnetic reed switch, inductor actuated and encapsulated for line output insertion (3A holding and 1 amp switching reed) |
| Pilot light 29 | A 12 volt lamp |
| Capacitor 161 | 1000 MFD, 50 volts |

Although the present system is disclosed as being used with a three-phase rectified rotary field system, it is to be understood that it can be used with other multi-phase rectified rotary field systems.

It is to be understood, that the voltage output at 19 can be increased to high levels by racing the engine to higher speeds. By the provision of the capacitor 161 and the switch 28, however, the same high voltage output can be obtained at lower engine speeds which will also maintain the current at a lower value which is desirable when welding thin gauge metals.

In the event that the system is to be used only for operating small power tools, then the feed-back circuitry 121, circuitry 131A, circuitry 131B, and relay coil 139 and plug 21 may be eliminated. In addition terminal 61 may be tied directly to terminal 53.

The present system may be used for the following applications:
1. Electrical welding on steel with rod sizes up to 5/32" dia.
2. Electrical welding or brazing with rod sizes up to 5/32" dia.
3. Cast iron welding.
4. Aluminum welding (with the addition of a heli-arc torch unit using an argon gas shroud).
5. Stainless Steel (with torch accessory).
6. Most types of brazing (with torch accessory).
7. Rapid charging of batteries up to 24 volts.
8. A power source for brush tools, saws, drills, lights, posthole diggers, etc.

I claim:

1. In a regenerative feed-back system of the type having the output of a multi-phase alternator coupled to its rotary field to self-excite the alternator, an improved alternator of the type having a stationary stator with a rotor concentrically located therein, comprising:
    an annular structure formed of ferro-magnetic material defining an annular stator core having a plurality of segments separated by slots which extend in a direction parallel to the axis of said stator core; and
    a multi-phase stator winding having for each phase a plurality of coils extending around the stator core on the inside thereof, each of the coils being of 13 A.W.G. electrically conductive wire and enclosing a selected number of segments three turns, whereby each slot has six wires passing through it.

2. The system of claim 1 wherein the stator core has 42 segments and each of the coils encircles three segments, whereby each phase has 14 coils, each having three turns.

3. The system of claim 2 wherein the alternator has three phases.

4. An alternator of the type having a stationary stator with a rotor concentrically located therein, comprising:
    an annular structure formed of ferro-magnetic material defining an annular stator core having a plurality of segments separated by slots which extend in a direction parallel to the axis of said stator core, and
    a multi-phase stator winding having for each phase a plurality of coils extending around the stator core on the inside thereof, each of the coils being of 13 A.W.G. electrically conductive wire and enclosing a selected number of segments three turns, whereby each slot has six wires passing through it.

5. The alternator of claim 4 wherein the stator core has 42 segments and each of the coils encircles three segments, whereby each phase has 14 coils, each having three turns.

6. The alternator of claim 5 wherein the alternator has three phases.

7. A system adapted to be coupled to a multi-phase rectified rotary field system to increase the power and current through regenerative feedback, comprising:
    a DC power supply for normally exciting the rotary field of said multi-phase system,
    output means coupled to the output of said multi-phase system for applying power to a load upon demand,
    means responsive to current flow from the output of said multi-phase system to a load for coupling the output of the multi-phase system to its rotary field to self-excite the multi-phase system, and
    means for electrically disconnecting the output of said DC power supply from said rotary field when the output of said multi-phase system is applied to said rotary field,
    said multi-phase rectified rotary field system including an alternator of the type having a stationary stator with a rotor concentrically located therein and comprising:

an annular structure formed of ferro-magnetic material defining an annular stator core having a plurality of segments separated by slots which extend in a direction parallel to the axis of said stator core; and a multi-phase stator winding having for each phase a plurality of coils extending around the stator core on the inside thereof, each of the coils being of 13 A.W.G. electrically conductive wire and enclosing a selected number of segments three turns, whereby each slot has six wires passing through it.

8. The system of claim 7 wherein the stator core has 42 segments and each of the coils encircles three segments, whereby each phase has 14 coils, each having three turns.

9. The system of claim 8 wherein the alternator has three phases.

10. A system adapted to be coupled to a multi-phase rectified rotary field system to increase the power and current through regenerative feedback, a DC power supply for normally exciting the rotary field of said multi-phase system, output means coupled to the output of said multi-phase system for applying power to a load upon demand, feedback circuitry including normally open switch means, coupled from the output of said multi-phase system to the input of said rotary field, control means responsive to current flow from the output of said multi-phase system to a load for closing said switch means for applying the output of said multi-phase system to its rotary field to self-excite the multi-phase system, and means for blocking the output of said DC power supply to said rotary field when the output of said multi-phase system is applied to said rotary field, said multi-phase rectified rotary field system including an alternator of the type having a stationary stator with a rotor concentrically located therein and comprising:

an annular structure formed of ferro-magnetic material defining an annular stator core having a plurality of segments separated by slots which extend in a direction parallel to the axis of said stator core; and a multi-phase stator winding having for each phase a plurality of coils extending around the stator core on the inside thereof, each of the coils being of 13 A.W.G. electrically conductive wire and enclosing a selected number of segments three turns, whereby each slot has six wires passing through it.

11. The system of claim 10 wherein the stator core has 42 segments and each of the coils encircles three segments, whereby each phase has 14 coils, each having three turns.

12. The system of claim 11 wherein the alternator has three phases.

13. A system to be coupled to the electrical system of a motor vehicle having a DC power supply, a regulator, and an alternator-rectifier system employed normally to charge the DC power supply and whose rotary field is driven by the vehicle engine, said regulator being normally connected to the rotary field of said alternator-rectifier system such that the rotary field is normally excited by the DC power supply by way of the regulator, the output of said alternator-rectifier system normally being connected to the input of said regulator and to said DC power supply, said system comprising:

output means to be coupled to the output of the alternator-rectifier system for applying power to a work load upon demand, feedback circuitry including normally open switch means coupled from the output of the alternator-rectifier system and adapted to be coupled to the rotary field, means for disconnecting the regulator from the rotary field of said alternator-rectifier system and for connecting said feedback circuitry to said rotary field, control circuitry to be connected to the output of the DC power supply and to normally open relay contacts by way of a relay coil for controlling said switch means in said feedback circuitry, DC power supply circuitry coupled from said DC power supply to said feedback circuitry, means for disconnecting the DC power supply from the output of said alternator-rectifier system and for connecting the DC power supply to said control circuitry and to said DC power supply circuitry, means coupled to the output of said alternator-rectifier system for closing said relay contacts in response to a load demand for energizing said relay coil in said control circuitry for closing said switch means in said feedback circuitry for completing a circuit from the output of said alternator-rectifier system to said rotary field by way of said feedback circuitry, said DC power supply circuitry including means for blocking the output of said DC power supply to said rotary field when the output of said alternator-rectifier system is applied to said rotary field, said alternator being of the type having a stationary stator with a rotor, defining said rotary field, concentrically located therein and comprising, an annular structure formed of ferro-magnetic material defining an annular stator core having a plurality of segments separated by slots which extend in a direction parallel to the axis of said stator core; and a multi-phase stator winding having for each phase a plurality of coils extending around the stator core on the inside thereof, each of the coils being of 13 A.W.G. electrically conductive wire and enclosing a selected number of segments three turns, whereby each slot has six wires passing through it.

14. The system of claim 13 wherein the stator core has 42 segments and each of the coils encircles three segments, whereby each phase has 14 coils, each having three turns.

15. The system of claim 14 wherein the alternator has three phases.

* * * * *